March 26, 1929.  R. A. VAIL  1,706,424

CRANK CASE VENTILATOR

Filed Aug. 22, 1927  2 Sheets-Sheet 1

Inventor
Ralph A. Vail
By Whittemore Hulbert
Whittemore & Belknap
Attorneys

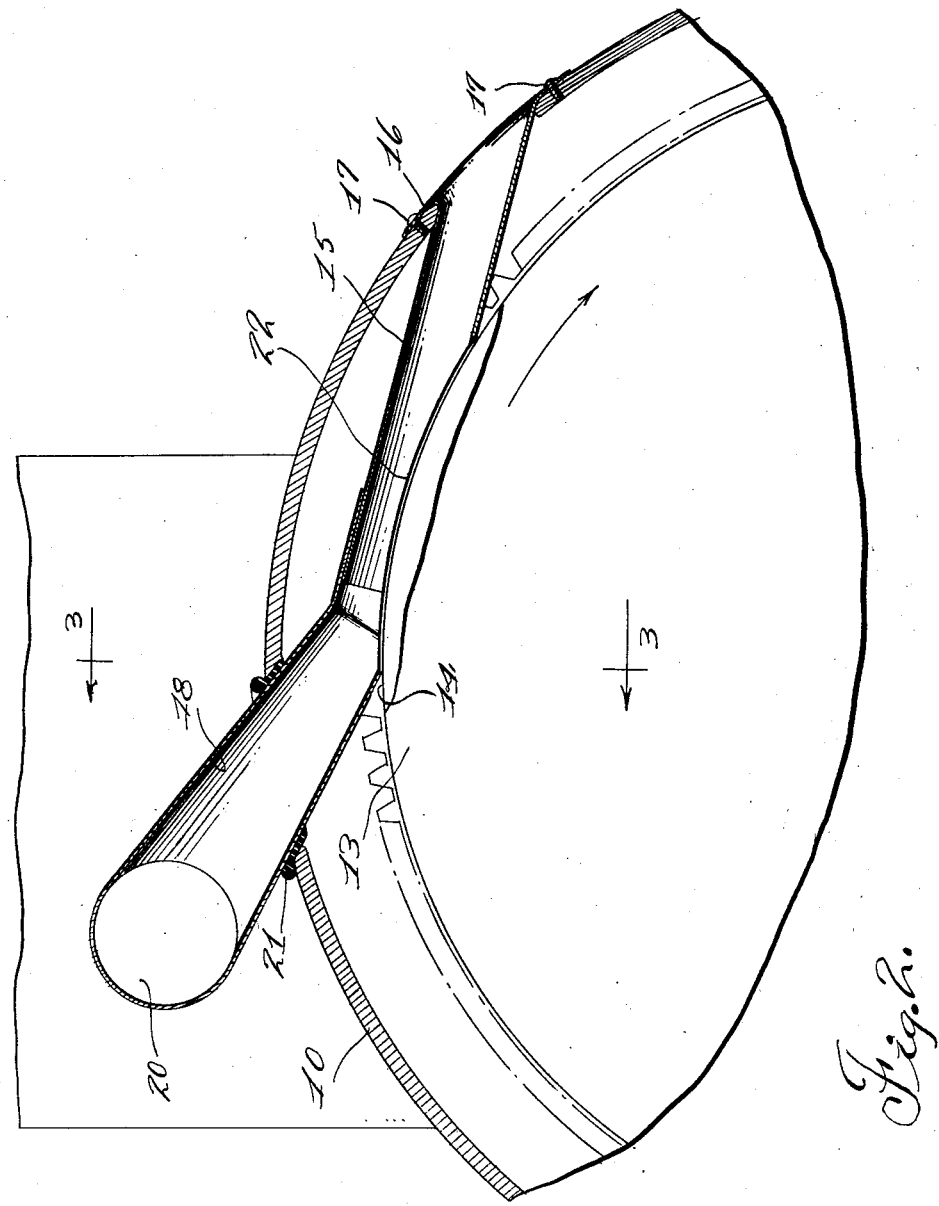

Patented Mar. 26, 1929.

1,706,424

UNITED STATES PATENT OFFICE.

RALPH A. VAIL, OF DETROIT, MICHIGAN, ASSIGNOR, BY MESNE ASSIGNMENTS, TO CHRYSLER CORPORATION, A CORPORATION OF DELAWARE.

CRANK-CASE VENTILATOR.

Application filed August 22, 1927. Serial No. 214,741.

This invention relates to a crank case ventilator and contemplates the provision of a ventilator of this character which will be simple in construction and yet thoroughly efficient in operation.

An object of this invention is to provide positive means for effectively withdrawing air from the crank case whereby the crank case may be kept free from water vapor and vaporized gasoline which would tend to dilute the oil within the crank case and rust the adjacent motor parts.

A further object of this invention is to provide a crank case ventilator in which the air is drawn from the crank case by the rotation of the fly wheel of the motor whereby the necessity of providing a separate suction mechanism is eliminated.

Other objects and advantages of this invention will become apparent as the following description proceeds particularly when reference is had to the accompanying drawings wherein:

Figure 2 is a sectional view taken on the line 2—2 of Figure 1; and

Figure 1:
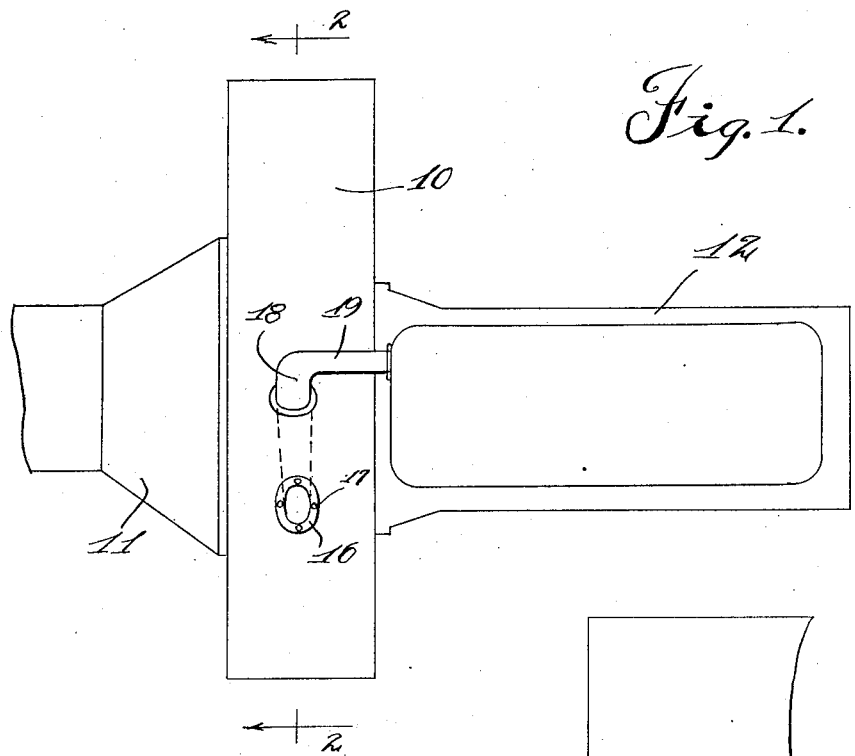
Figure 1 is a semi-diagrammatic view of an engine equipped with my improved ventilator.

Referring now more particularly to the drawings wherein like reference characters designate corresponding parts throughout all views of the same, the numeral 10 designates the fly wheel housing, 11 the clutch housing, and 12 the crank case of an engine. Mounted within the fly wheel housing is the fly wheel 13 having a portion of its periphery smooth as designated at 14. All of this is of the usual construction and forms no part of my inventive idea.

For ventilating the crank case, I rely upon the centrifugal force created by the rotation of the fly wheel 13 and utilize this centrifugal force to create a suction in a conduit which suction is transmitted to the crank case. More particularly I arrange a conduit or housing 15 as a secant across a portion of the fly wheel housing 10. This conduit or housing 15 may be secured to the fly wheel housing in any desired manner, although I find it practical to secure this conduit to the housing by terminating the conduit adjacent one side of the housing and bending back the end of the conduit to form the flanges 16 which are secured to the fly wheel housing by suitable fasteners 17.

The opposite end of the conduit or housing 15 projects out of the fly wheel housing and is secured to an elbow 18 to which in turn a conduit 19 is secured, which conduit opens as at 20 into the crank case housing. If desired, I may provide suitable packing 21 around the conduit 15 where the same projects through the fly wheel housing 10.

Figure 3:
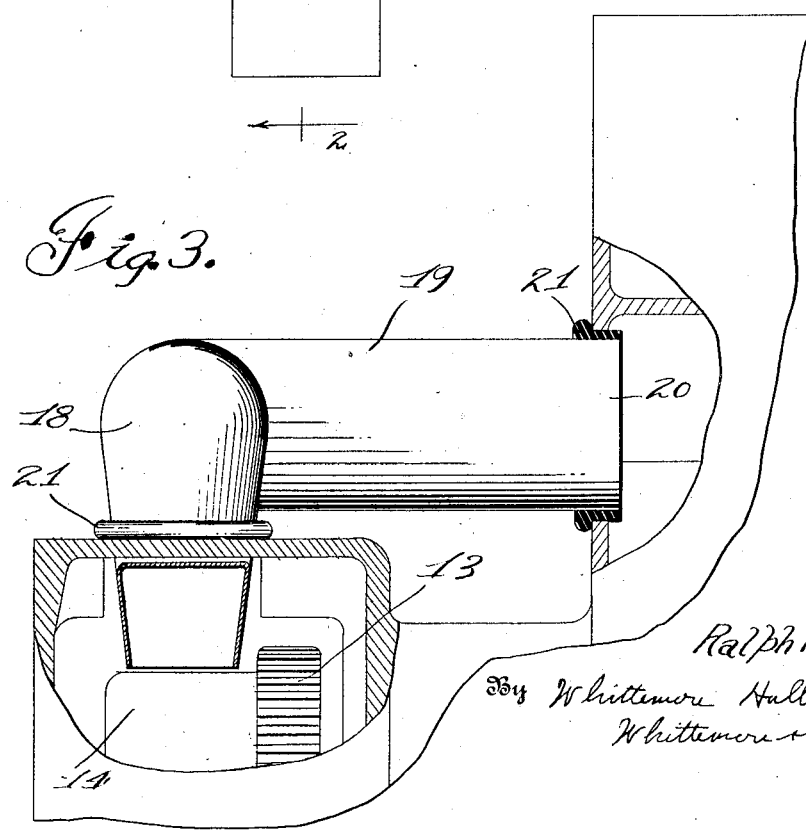
Figure 3 is a sectional view taken on the line 3—3 of Figure 2.

As clearly shown in Figure 2 of the drawing, the conduit or housing 15 lies at a tangent to the fly wheel 13 and I form in the conduit or housing 15, a cut away portion 22 which may be arcuate-shaped so that a portion of the periphery of the fly wheel projects up into the conduit or housing 15. As will be clearly seen from Figure 3 of the drawing, the conduit 15 is adjacent the smooth portion 14 of the fly wheel so that the fly wheel may rotate freely although the same is in proximity to the conduit 15.

From the above, it is believed that the operation of my ventilator will be readily apparent. With the fly wheel rotating in a clockwise direction as indicated by the arrows in Figure 2, a centrifugal force will be created which will tend to exhaust the air from the conduit or housing 15. Further by virtue of the projection of a portion of the rotating fly wheel into the conduit 15 through the cut away portion 22, the friction between the fly wheel rim and the surrounding air will also tend to establish a flow of air in the conduit 15 from the left to the right as indicated by the arrows in Figure 2. The suction created in the conduit 15 will be transmitted through the elbow 18 and the conduit 19 to the interior of the crank case so that the air in the crank case will be withdrawn and exhausted through the open end of the housing 15 into the atmosphere.

It will thus be seen that I have provided an efficient and simple means for positively withdrawing air from the crank case and discharging the same into the atmosphere. Further, it will be seen that by my invention the crank case will be ventilated without forcing a supply of air through the crank case, which air might contain water vapor or other harmful ingredients which would tend to injure the interior of the crank case.

While I have shown and described one embodiment of my inventive idea somewhat in detail, it will be readily apparent that various changes may be made in the details of construction and arrangement of parts. I therefore reserve the right to make such changes as will fall within the purview of the attached claims.

What I claim as my invention is:

1. The combination with a crank case and a fly wheel, of means for utilizing the peripheral discharge from said fly wheel to create a suction and means for transmitting this suction to the crank case to withdraw the air therefrom.

2. In combination, a crank case, a fly wheel, and means operable by the peripheral discharge from the fly wheel for withdrawing air from the said crank case.

3. The combination with a crank case and a fly wheel, of means for utilizing the peripheral discharge from said fly wheel to withdraw air from the crank case.

4. The combination with a crank case and a fly wheel, of means for withdrawing air from the said crank case, said means including a conduit having one end communicating with the crank case and its other end so arranged with respect to the fly wheel that a suction is created in the said conduit by the peripheral discharge from the fly wheel upon rotation of the said fly wheel.

5. The combination with a crank case and a fly wheel, of means for withdrawing air from the said crank case, said means including a housing arranged tangentially to the said fly wheel whereby a suction is created in the said housing upon the rotation of the said fly wheel.

6. The combination with a crank case and a fly wheel, of means for withdrawing air from the said crank case, said means including a conduit provided with a cut out portion, the said conduit being arranged with its cut out portion adjacent the periphery of the fly wheel whereby rotation of the fly wheel creates a suction in the said conduit.

7. The combination with a crank case, a fly wheel and a housing for said fly wheel, of means for withdrawing air from the said crank case, said means including a conduit having an end communicating with the crank case and having a portion arranged as a secant through said fly wheel housing, the last mentioned portion of the conduit being provided with a cut out portion adjacent the said fly wheel whereby rotation of the fly wheel creates a suction in the said conduit.

8. The combination with a crank case and a fly wheel, of means for withdrawing air from said crank case, said means including a conduit communicating with said crank case and having a portion arranged tangentially to said fly wheel, the tangentially arranged portion of said conduit being provided with an opening whereby a portion of the said fly wheel projects up into the said conduit and rotation of the fly wheel creates a suction in the said conduit.

In testimony whereof I affix my signature.

RALPH A. VAIL.